United States Patent
Furukawa

(10) Patent No.: US 9,495,778 B2
(45) Date of Patent: Nov. 15, 2016

(54) INFORMATION PRESENTING APPARATUS AND METHOD FOR CONFIRMED AND TENTATIVE TRACKS

(71) Applicant: Kabushiki Kaisha Toshiba, Minato-ku (JP)

(72) Inventor: Hidetoshi Furukawa, Kawasaki (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 508 days.

(21) Appl. No.: 13/974,541

(22) Filed: Aug. 23, 2013

(65) Prior Publication Data

US 2014/0055460 A1  Feb. 27, 2014

(30) Foreign Application Priority Data

Aug. 27, 2012 (JP) .................................. 2012-187066

(51) Int. Cl.
| | | |
|---|---|---|
| G06F 12/02 | (2006.01) | |
| G06T 11/20 | (2006.01) | |
| G01S 7/00 | (2006.01) | |
| G01S 7/22 | (2006.01) | |
| G01S 13/72 | (2006.01) | |

(52) U.S. Cl.
CPC .............. G06T 11/206 (2013.01); G01S 7/003 (2013.01); G01S 7/22 (2013.01); G01S 13/726 (2013.01)

(58) Field of Classification Search
CPC ................................ G06T 11/206; G01S 3/02
See application file for complete search history.

(56) References Cited

U.S. PATENT DOCUMENTS

| | | | | |
|---|---|---|---|---|
| 6,618,324 | B1* | 9/2003 | Lane ..................... | G01S 15/66 367/124 |
| 2003/0085840 | A1* | 5/2003 | Benner ................. | G01S 7/4004 342/450 |
| 2004/0027274 | A1* | 2/2004 | Driessen ............... | G01S 7/2923 342/91 |
| 2010/0283662 | A1* | 11/2010 | Fox ....................... | G01S 7/2922 342/53 |

FOREIGN PATENT DOCUMENTS

JP        2003-43132        2/2003

OTHER PUBLICATIONS

Samuel S. Blackman, "Multiple-Target Tracking with Radar Applications", Artech House, 1986, pp. 152-153.

* cited by examiner

*Primary Examiner* — Kee M Tung
*Assistant Examiner* — Whitney Pointe
(74) *Attorney, Agent, or Firm* — Oblon, McClelland, Maier & Neustadt, L.L.P.

(57) ABSTRACT

According to one embodiment, an information presenting apparatus receives each observed value from sensors, and maintains a track of each target by updating the track based on an observed value having a correlation with the track. A likelihood ratio for a tentative track, which has not yet been determined to be a track of a target, is computed and compared with an upper limit threshold. When the likelihood ratio is greater than or equal to the upper limit threshold, the tentative track is determined to be a track of a target. When the likelihood ratio is greater than or equal to a monitor threshold which is lower than the upper limit threshold, the tentative track is determined to be a monitor track. The information of the track and the monitor track are presented.

18 Claims, 13 Drawing Sheets

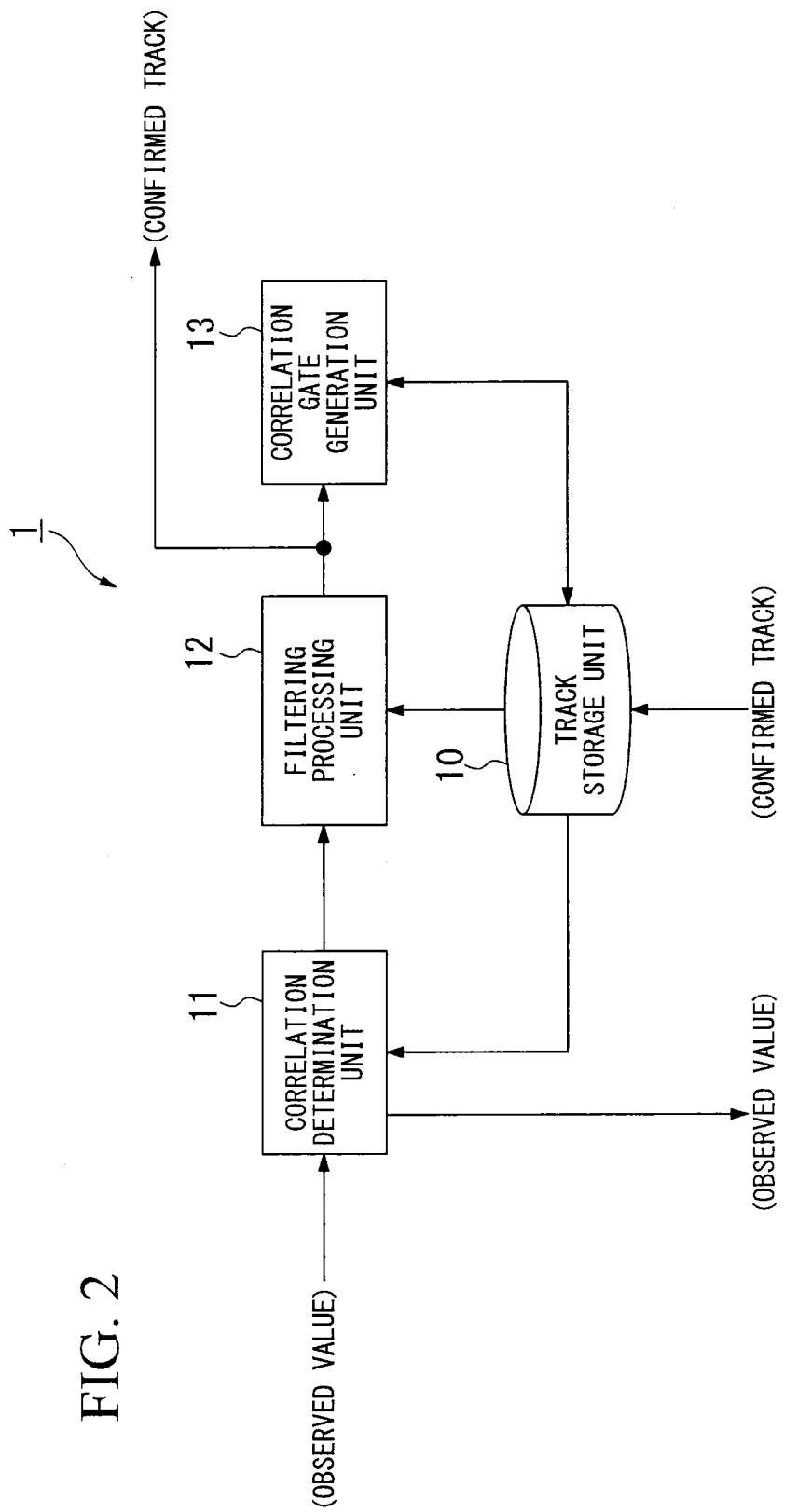

FIG. 3

| INDEX | TRACK NUMBER | UPDATE TIME | UPDATED VALUE (STATE VECTOR, COVARIANCE MATRIX) | PREDICTED VALUE (TIME, STATE VECTOR, COVARIANCE MATRIX) | NUMBER OF UPDATES OF TENTATIVE TRACK (m) | NUMBER OF SCANS (k) | LIKELIHOOD RATIO (ST) |
|---|---|---|---|---|---|---|---|
| 1 | 1 | HH:MM:SS.SS | $(\hat{x}1, \hat{P}1)$ | $(tp, \tilde{x}1, \tilde{P}1)$ | m1 | k1 | ST1 |
| 2 | 2 | hh:mm:ss.ss | $(\hat{x}2, \hat{P}2)$ | $(tp, \tilde{x}2, \tilde{P}2)$ | m2 | k2 | ST2 |
| ... | ... | ... | ... | ... | ... | ... | ... |
| N | n | HH:MM:SS.SS | $(\hat{x}n, \hat{P}n)$ | $(tp, \tilde{x}n, \tilde{P}n)$ | mn | kn | STn |

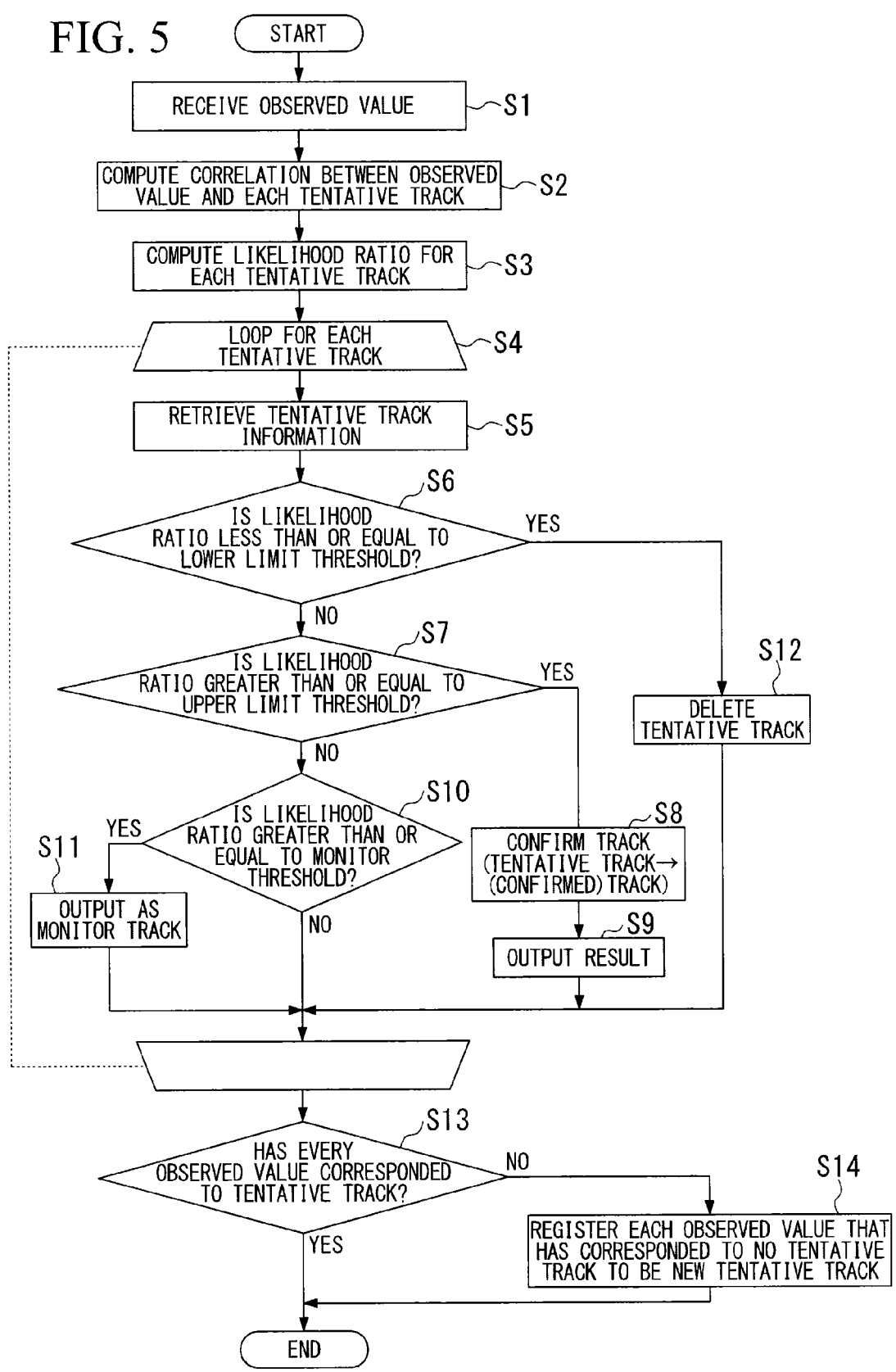

INFORMATION PRESENTING APPARATUS AND METHOD FOR CONFIRMED AND TENTATIVE TRACKS

CROSS-REFERENCE TO RELATED APPLICATION

This application is based upon and claims the benefit of priority from Japanese Patent Application No. 2012-187066, filed Aug. 27, 2012; the entire contents of which are incorporated herein by reference.

FIELD

Embodiments described herein relate generally to an information presenting apparatus that presents information about a target using observed values supplied by sensors, a corresponding method, and a non-transitory computer-readable storage medium that stores a program therefor.

BACKGROUND

Information presenting apparatuses are known which compute information (that includes a state estimator and called a "track") of a target based on observed values supplied by sensors, and display a result of the computation.

FIG. 11 is a block diagram showing an example of the known information presenting apparatuses, which includes a track maintenance unit 101, a track generation unit 102, and an operation and display unit 103.

The track maintenance unit 101 computes a correlation between each observed value supplied from sensors and a "confirmed track" (that may be simply called the "track" below) of a target, and updates the track using each observed value which has the relevant correlation. In addition, the track maintenance unit 101 outputs each observed value which has no correlation with the track of the target to the track generation unit 102. The track maintenance unit 101 also outputs the track of the target, which has been updated using each observed value which has the relevant correlation, to the operation and display unit 103.

The track generation unit 102 handles each observed value input from the track maintenance unit 101 (i.e., observed value which has no correlation with the track of the target), as a tentative track which has the potential of a track of a target. More specifically, the track generation unit 102 computes a correlation between the input observed value and an existing tentative track. If there is no correlation, the track generation unit 102 handles the relevant observed value as a new tentative track. If there is a required correlation, the track generation unit 102 updates the existing tentative track using the relevant observed value.

In addition, the track generation unit 102 computes a likelihood ratio for each tentative track by means of an SPRT (Sequential Probability Ratio Test) method. Based on the computed likelihood ratio, an upper limit threshold $T_U$, and a lower limit threshold $T_L$, the track generation unit 102 determines whether the relevant tentative track is determined to be a confirmed track of the corresponding target or is abandoned. The upper limit threshold $T_U$ is a value used when the tentative track is determined to be a track of the target. The lower limit threshold $T_L$ is a value used when the tentative track is determined to be a track by a false alarm. Here, the false alarm occurs where a non-target event exceeds a target-detection criterion and is identified as a target.

The display unit 103 displays the track of each target, which is input from the track maintenance unit 101, on a display screen.

FIG. 12 is a flowchart showing a specific example of the operation flow that is applied to each tentative track and is executed by the track generation unit 102 in the conventional information presenting apparatus.

As shown in the flowchart, the track generation unit 102 receives each observed value from the track maintenance unit 101 (see step S101). The track generation unit 102 then computes a correlation between the received observed value and each tentative track (see step S102) so as to determine a correspondence relationship between the observed value and the tentative track.

The track generation unit 102 executes an operation from step S103 to step S108 based on (i) a first error rate (called "Type I error") of an error such that a track by a false alarm is determined to be a track of a target, (ii) a second error rate (called "Type II error") of an error such that a track of the target is determined to be a track by a false alarm, (iii) a probability of detecting a target, (iv) a probability of detecting a false alarm, (v) the number of scans of a tentative track, and (vi) the number of updates of the tentative track for the scanning thereof.

The track generation unit 102 computes a likelihood ratio for each tentative track (see step S103). The track generation unit 102 then repeats an operation from step S104 to step S108 for each tentative track.

The track generation unit 102 determines whether or not the likelihood ratio computed in the above step S103 is less than or equal to a lower limit threshold $T_L$ (see step S104). If the likelihood ratio of the relevant tentative track is less than or equal to the lower limit threshold $T_L$, (i.e., "YES" in step S104), the track generation unit 102 abandons the tentative track (see step S108) and executes a process applied to the next tentative track. If the likelihood ratio of the relevant tentative track is greater than the lower limit threshold $T_L$ (i.e., "NO" in step S104), the track generation unit 102 determines whether or not the likelihood ratio computed in the above step S103 is greater than or equal to an upper limit threshold $T_U$ (see step S105).

If the likelihood ratio of the relevant tentative track is greater than or equal to the upper limit threshold $T_U$ (i.e., "YES" in step S105), the track generation unit 102 determines the tentative track to be a confirmed track (see step S106). The track generation unit 102 then outputs the relevant tentative track as a confirmed track to the track maintenance unit 101 (see step S107) and executes the process applied to the next tentative track. If the likelihood ratio of the relevant tentative track is less than the upper limit threshold $T_U$ (i.e., "NO" in step S105), the track generation unit 102 keeps the tentative track as itself (i.e., as a tentative track) and executes the process applied to the next tentative track.

For example, the track generation unit 102 performs the above-described operation for each scan of the tentative track.

FIG. 13 is a diagram that shows an example of the track displayed on a display screen 300 of the conventional information presenting apparatus. As shown in FIG. 13, the display unit 103 displays a track 201 (see a double circle) of a target on the display screen 300, where the track 201 has been determined (to be a track) by the track generation unit 102 and maintained by the track maintenance unit 101.

FIG. 14 is a diagram that shows an example of displaying, not only the track as shown in FIG. 13, but also all observed values supplied by the sensors as observed values 500 on the display screen 300.

In FIG. 13 or 14, the square indicated by the reference numeral 200 is shown for convenience to indicate the position at which an observed value for the target has been obtained, in comparison with the position of the track 201 of the target. Therefore, actually, no mark that indicates the position 200 is displayed on the display screen 300.

BRIEF DESCRIPTION OF THE DRAWINGS

FIG. 2 is a block diagram that shows the structure of a track maintenance unit in the first embodiment.

FIG. 3 shows an example of a track table stored in a track storage unit in the first embodiment.

FIG. 5 is a flowchart that shows an operation applied to each tentative track in the first embodiment.

DETAILED DESCRIPTION

According to one embodiment, an information presenting apparatus receives each observed value from sensors, and maintains a track of each target by updating the track based on an observed value having a correlation with the track. A likelihood ratio for a tentative track, which has not yet been determined to be a track of a target, is computed and compared with an upper limit threshold. When the likelihood ratio is greater than or equal to the upper limit threshold, the tentative track is determined to be a track of a target. When the likelihood ratio is greater than or equal to a monitor threshold which is lower than the upper limit threshold, the tentative track is determined to be a monitor track. The information of the track and the monitor track are presented.

Various embodiments will be described hereinafter with reference to the accompanying drawings.

The information presenting apparatus in each embodiment displays on a display screen thereof, not only the track of a target, but also a monitor track selected from tentative tracks, that has a certain level of likelihood. Accordingly the information presenting apparatus of the embodiment can (i) reduce the time lag until the corresponding tentative track is determined to be a confirmed track of a target and is displayed, and (ii) appropriately control the amount of information observed by the operator of the apparatus.

First Embodiment

Figure 1:
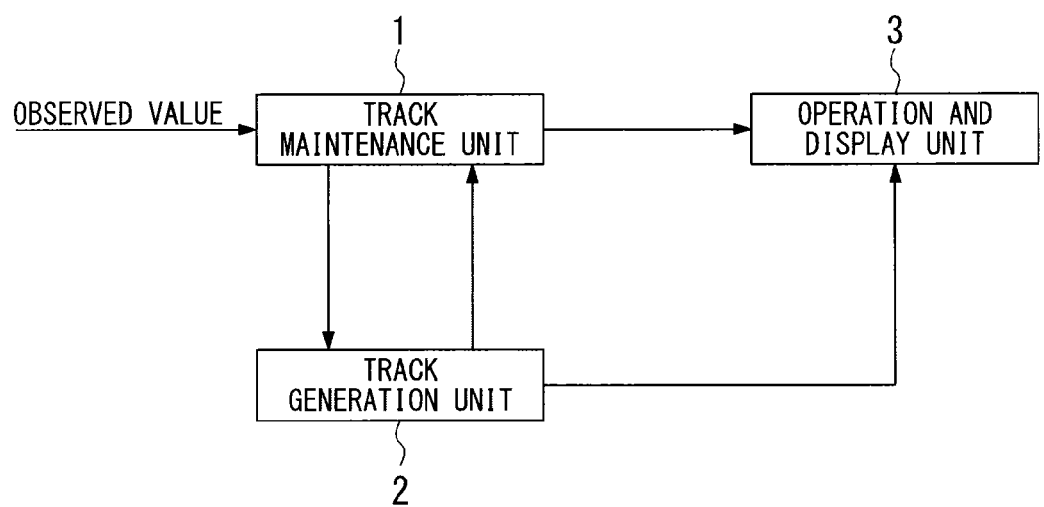
FIG. 1 is a block diagram that shows the structure of an information presenting apparatus of a first embodiment.

FIG. 1 is a block diagram showing the structure of the information presenting apparatus as a first embodiment, which includes a track maintenance unit 1, a track generation unit 2, and an operation and display unit 3. Based on observed values received from n sensors (radar apparatus and the like, where n is 1 or greater), the information presenting apparatus computes the track of a target and displays a result of the computation.

The track maintenance unit 1 receives each observed value obtained based on signals received by the sensors. The observed value is information obtained by subjecting the received signals to a specific signal processing, and includes (i) information that indicates the position or the like of the target (e.g., information about distance, angle of elevation, and azimuth, or information about longitude, latitude, and altitude) (ii) information that indicates the observation time at which the corresponding observation was executed. The track maintenance unit 1 computes a correlation between the observed value and a "confirmed track" (that may be simply called the "track" below) of each target, and updates the track. The track maintenance unit 1 also outputs the track of each target to the operation and display unit 3 so that the track is displayed by the operation and display unit 3. Furthermore, the track maintenance unit 1 acquires information of each tentative track, that has satisfied a predetermined condition in the track generation unit 2, as information of a confirmed track, and stores and maintains the relevant information.

The track generation unit 2 receives each observed value that had no correlation with the track of each target in the track maintenance unit 1. The track generation unit 2 handles the observed value received from the track maintenance unit 1 as a tentative track which has the potential of a track of a target. More specifically, the track generation unit 2 computes a correlation between the observed value and each tentative track, and updates tentative track information for each tentative track by using the observed value that has the above correlation. In this process, the track generation unit 2 handles the observed value, which has no correlation in the above computation, as a new tentative track.

In addition, the track generation unit 2 computes a likelihood ratio for each tentative track. Based on the computed likelihood ratio, the track generation unit 2 determines whether or not the relevant tentative track is determined to be a track of a target. If it is determined that the tentative track is a track of a target, information of the tentative track is output as information of a confirmed track. The track generation unit 2 also determines whether or not the relevant tentative track is determined to be a track by a false alarm. If it is determined that the tentative track is a track by a false alarm, the track generation unit 2 deletes the relevant tentative track. Additionally, as explained later, based on the likelihood ratio of each tentative track, it is determined whether or not the tentative track is determined to be a monitor track.

The above likelihood ratio of the tentative track is a numerical value obtained by accumulating values of ratio between (i) probability that a target is present in a correlation gate (that indicates a correlation region) for the target and (ii) probability that a false alarm is present in the correlation gate, in consideration of the presence or absence of correlation with a temporal axis. That is, the likelihood ratio is proportional to the number of times the correlation is confirmed between the correlation gate for the relevant tentative track and each observed value supplied by the track maintenance unit 1. Accordingly, the higher the likelihood ratio, the higher the probability that the tentative track is a track of the target, and the lower the likelihood ratio, the higher the probability that the tentative track is a track by a false alarm.

The operation and display unit 3 displays each track output from the track maintenance unit 1 and each monitor track output from the track generation unit 2 on its display screen.

FIG. 2 is a block diagram that shows the structure of the track maintenance unit 1 in the present embodiment. As shown in FIG. 2, the track maintenance unit 1 includes a track storage unit 10, a correlation determination unit 11, a filtering processing unit 12, and a correlation gate generation unit 13.

In the track storage unit 10, a track table that includes track information about a track of each target is stored. FIG. 3 shows an example of the track table stored in the track storage unit 10. As shown in FIG. 3, the track table has columns for items for an index, the track number, update time, updated values, predicted values, the number of updates of tentative track (m), the number of scans (k), and likelihood ratio (ST). Each line of the track table shows track information that includes values of the respective items for the track of each target.

The index is a serial number used for managing the track information in each lime of the track table.

The track number is a number referred to when identifying each unique track.

The update time is a time (of observation) when the observed value, which was used for updating the relevant track of the target, was obtained.

The updated values are information about a state vector ($\hat{x}$: which contains information such as position and velocity) for the target at the time indicated by the update time, and a corresponding covariance matrix therefor ($\hat{P}$).

The predicted values are information about time (tp), a state vector ($\tilde{x}$: which contains information such as position and velocity) for the target at that time (tp), and a corresponding covariance matrix therefor ($\tilde{P}$).

The number of updates of tentative track (m) and the number of scans (k) are respectively the number of times the relevant tentative track has been updated and the number of times the tentative track has been scanned until the tentative track is confirmed as a track in the track generation unit 2.

The likelihood ratio (ST) is a likelihood ratio obtained when the tentative track is determined to be a confirmed track.

For example, in the track table of FIG. 3, track information identified by the track number "2" is stored in the second line indicated by the index "2". The track information of the track number "2" includes the update time "hh:mm:ss.ss", the updated values ($\hat{x}2$, $\hat{P}2$), the predicted values (tp, $\tilde{x}2$, $\tilde{P}2$), the number of updates of tentative track (m2), the number of scans (k2), and the likelihood ratio (ST2).

Now returning to FIG. 2, the structure of the track maintenance unit 1 will be further explained.

The correlation determination unit 11 receives each observed value, and computes a correlation between the received observed value and the track of each target stored in the track storage unit 10. Specifically, the correlation determination unit 11 sequentially retrieves the track information stored in the track storage unit 10, and determines a correlation gate (i.e., correlation region) for the target based on the predicted values included in the retrieved track information. More specifically, the correlation determination unit 11 computes and determines the correlation gate using the state vector and the covariance matrix which are included in the predicted values of the retrieved track information. The correlation determination unit 11 then determines whether or not a state vector indicated by the observed value is present within the determined correlation gate. If the observed value (i.e., the relevant state vector) is present within the determined correlation gate, the correlation determination unit 11 informs the filtering processing unit 12 of a correspondence relationship between the observed value and the track number of the track associated with the relevant correlation gate. On the other hand, if the observed value is not present in the correlation gate, the correlation determination unit 11 determines that the observed value has no correlation with the track associated with the correlation gate. The correlation determination unit 11 outputs each observed value, which has no correlation with every track stored in the track storage unit 10, to the track generation unit 2.

The filtering processing unit 12 is informed by the correlation determination unit 11 of the above-described correspondence relationship between the track number and the observed value. Based on the correspondence relationship between the track number and the observed value, the filtering processing unit 12 computes updated values of the state vector and the covariance matrix for the target at the relevant observation time, and updates the corresponding track information stored in the track storage unit 10. The filtering processing unit 12 also outputs the computed updated values of the state vector and the covariance matrix to the correlation gate generation unit 13 and the operation and display unit 3.

Based on the updated values of the state vector and the covariance matrix for each target (which are input from the filtering processing unit 12), the correlation gate generation unit 13 computes a state vector and a covariance matrix (of the target) as predicted values at the timing (i.e., time) when the next observed value is input. For example, the correlation gate generation unit 13 computes a position to which the target will move during the period of scan using the sensors, an anticipated velocity of such movement, and an anticipated error range for the above position, so as to obtain the predicted values. The correlation gate generation unit 13 updates, for each target, the predicted values for the track information in the track table stored in the track storage unit 10 according to the information that includes the computed state vector and covariance matrix and the corresponding time of the target.

Figure 4:
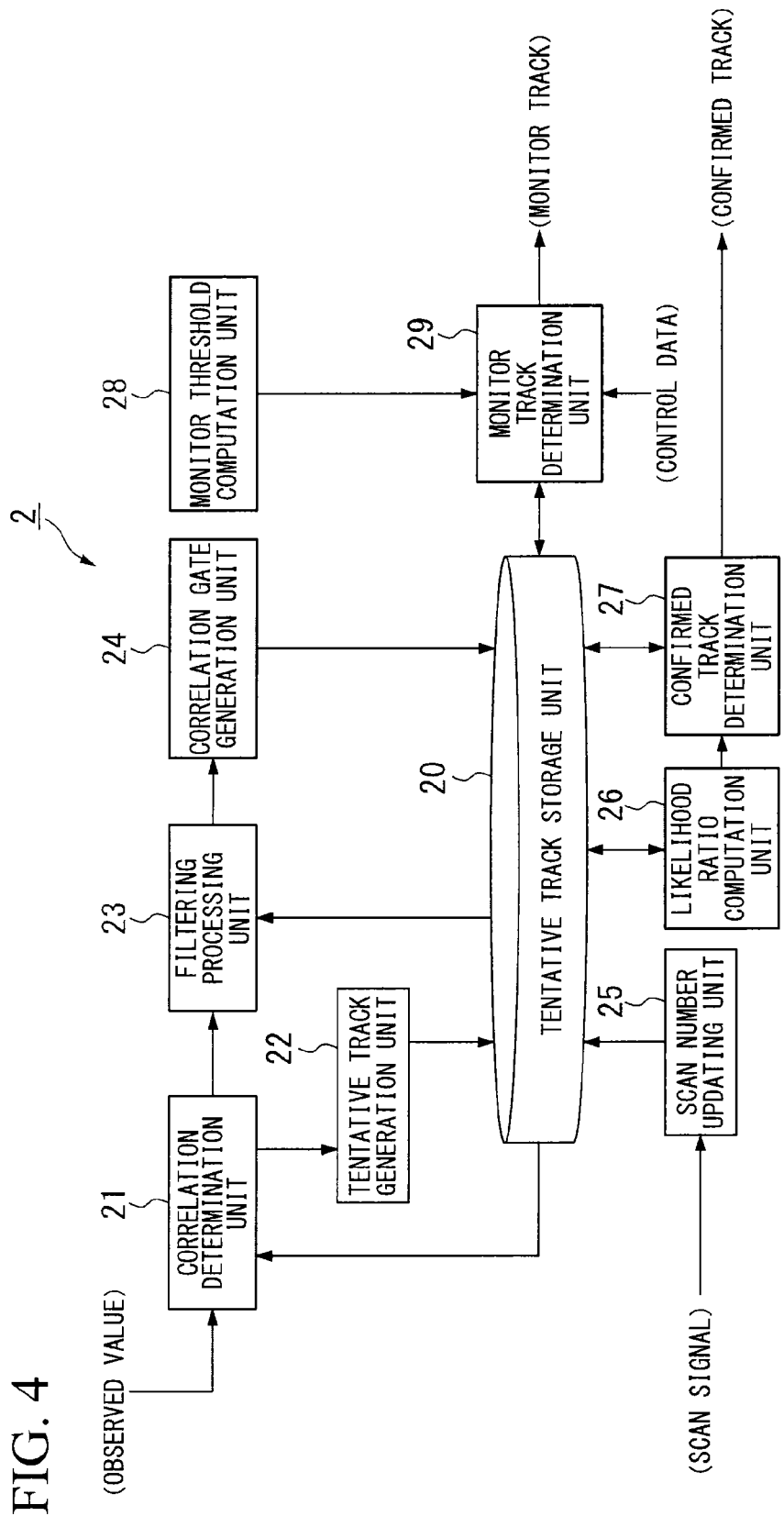
FIG. 4 is a block diagram that shows the structure of a track generation unit in the first embodiment.

FIG. 4 is a block diagram that shows the structure of the track generation unit 2 in the present embodiment. As shown in FIG. 4, the track generation unit 2 includes a tentative track storage unit 20, a correlation determination unit 21, a tentative track generation unit 22, a filtering processing unit 23, a correlation gate generation unit 24, a scan number updating unit 25, a likelihood ratio computation unit 26, a confirmed track determination unit 27, a monitor threshold computation unit 28, and a monitor track determination unit 29.

In the tentative track storage unit 20, a tentative track table that includes tentative track information about each tentative track is stored. The tentative track table has the same structure as that of the track table shown in FIG. 3. That is, each line of the tentative track table is associated with tentative track information about each tentative track. The tentative track table has a column for an item of a tentative track number, instead of the track number. The tentative track number is a number referred to when identifying each unique tentative track.

The correlation determination unit 21 receives each observed value from the track maintenance unit 1, where the observed value has no correlation with every track stored in the track storage unit 10 of the track maintenance unit 1. The correlation determination unit 21 computes a correlation between the received observed value and each tentative track stored in the tentative track storage unit 20, where a specific operation therefor is similar to that performed in the correlation determination unit 11.

That is, the correlation determination unit 21 sequentially retrieves the tentative track information stored in the tentative track storage unit 20, and determines a correlation gate (i.e., correlation region) for a target based on position information and the covariance matrix indicated by the predicted values included in the retrieved tentative track information. More specifically, the correlation determination unit 21 computes and determines the correlation gate using the state vector and the covariance matrix which are included in the predicted values of the retrieved tentative track information. The correlation determination unit 21 then determines whether or not a state vector indicated by the observed value is present within the determined correlation gate. If the observed value (i.e., the relevant state vector) is present within the determined correlation gate, the correlation determination unit 21 informs the filtering processing unit 23 of a correspondence relationship between the observed value and the tentative track number of the tentative track associated with the relevant correlation gate. On the other hand, the correlation determination unit 21 outputs each observed value, which has no correlation with every tentative track stored in the tentative track storage unit 20, to the tentative track generation unit 22.

The tentative track generation unit 22 determines that the observed value received from the correlation determination unit 21 has the potential of a track of a new target, and generates tentative track information based on the received observed value. The tentative track generation unit 22 stores the generated tentative track information into the tentative track storage unit 20. In addition, the tentative track generation unit 22 sets each of the number of updates of tentative track and the number of scans to an initial value of 0, and also sets the likelihood ratio to a value that is computed in accordance with the number of updates of tentative track and the number of scans.

The filtering processing unit 23 is informed by the correlation determination unit 21 of a correspondence relationship between the tentative track number and the observed value. Based on the tentative track and the tentative track information which determine the correspondence relationship, the filtering processing unit 23 computes updated values of the state vector and the covariance matrix for the corresponding target at the relevant observation time, and updates the corresponding tentative track information stored in the tentative track storage unit 20. The filtering processing unit 23 also outputs the computed updated values of the state vector and the covariance matrix to the correlation gate generation unit 24.

Based on the updated values of the state vector and the covariance matrix for each target (which are input from the filtering processing unit 23), the correlation gate generation unit 24 computes a state vector and a covariance matrix of the target at the timing (i.e., time) when the next observed value is input. For example, the correlation gate generation unit 24 updates, for each target, the predicted values for the tentative track information stored in the tentative track storage unit 20 according to predicted values that include the computed state vector and covariance matrix of the target.

The scan number updating unit 25 performs an update operation to increase the number of scans (included in each tentative track information line stored in the tentative track storage unit 20) by 1 every time the scan number updating unit 25 receives a scan signal. The scan signal is a signal input from each sensor (such as a radar apparatus) and indicates that a scan has been executed so that the sensor can receive a signal from each target. If the sensor outputs the scan signal every time the scan is applied to a limited area, the scan number updating unit 25 updates the number of scans of the tentative track information associated with each target that is present in the limited area. The number of scans represents the number of opportunities to update the relevant tentative track (when the scan rate is constant).

When the scan signal is received, the likelihood ratio computation unit 26 retrieves, for each tentative track, the corresponding tentative track information from the tentative track storage unit 20, and computes a likelihood ratio using the number of updates of the tentative track and the number of scans included in the retrieved tentative track information. Every time the scan signal is received, the likelihood ratio computation unit 26 executes an update operation to replace the likelihood ratio included in the tentative track information for each tentative track, with the newly computed likelihood ratio. The likelihood ratio computed by the likelihood ratio computation unit 26 indicates a probability that the relevant tentative track is a track of a target. Given the number "k" of scans and the number "m" of updates for the tentative track, the likelihood ratio is computed based on the SPRT method by the following formula (1):

$$ST(k,m) = ma_1 + ka_2 \qquad (1)$$

In the above formula (1), coefficients $a_1$ and $a_2$ are respectively represented by the following formulas (2) and (3):

$$a_1 = \ln\left(\frac{P_D/(1-P_D)}{P_F/(1-P_F)}\right) \qquad (2)$$

$$a_2 = -\ln\left(\frac{(1-P_F)}{(1-P_D)}\right) \qquad (3)$$

In the above formulas (2) and (3), $P_D$ indicates a probability of detecting a target, and $P_F$ indicates a probability of detecting a false alarm.

The present embodiment employs the SPRT method so as to determine each tentative track to be a track of a target. In the SPRT method, it is determined whether or not the tentative track is determined to be a track of a target, based on the likelihood ratio ST computed using the number k of scans and the number m of updates for the tentative track. The SPRT method is used to determine which of the following two hypotheses is chosen: null hypothesis H0 and alternative hypothesis H1. When the SPRT method is used to determine a tentative track to be a track of a target, a hypothesis such that no target is present is assigned to H0. That is, if H0 is adopted, it is determined that the tentative track is a track by a false alarm. On the other hand, a hypothesis such that there is a target is assigned to H1. That is, if H1 is adopted, it is determined that the tentative track is a track of the target.

In the SPRT method, the likelihood ratio ST is estimated every time the scan is performed. According to the result of the estimation, one of the following three items is selected:
1. to choose H0, which means that the tentative track is a track by a false alarm;
2. to choose H1, which means that the tentative track is a track of a target; and
3. to choose none of H0 and H1 and to continue the determination process for the tentative track.

In addition to the above-described coefficients $a_1$ and $a_2$, a lower limit threshold $T_L$ and an upper limit threshold $T_U$ are predetermined so as to determine whether the tentative track is a track of a target, or a track by a false alarm. The lower limit threshold $T_L$ and the upper limit threshold $T_U$ are represented by the following formulas (4) and (5) respectively:

$$T_L = \ln\left(\frac{\beta}{1-\alpha}\right) \qquad (4)$$

$$T_U = \ln\left(\frac{1-\beta}{\alpha}\right) \qquad (5)$$

In the above formulas (4) and (5), α denotes a first error rate (corresponding to the base error rate of the present invention) of an error such that a track by a false alarm is determined to be a track of a target, and β denotes a second error rate of an error such that a track of the target is determined to be a track by a false alarm. Additionally, in the above formula (4), "(1−α)" indicates a probability that a track by a false alarm is determined to be as such (i.e., a track by a false alarm) and the relevant tentative track is deleted. In the above formula (5), "(1−β)" indicates a probability (corresponding to the base probability of the present invention) that a track of a target is determined to be as such (i.e., a track of a target).

For each tentative track information item stored in the tentative track storage unit 20, the confirmed track determination unit 27 compares the likelihood ratio ST in the relevant tentative track information with the predetermined lower limit threshold $T_L$ and upper limit threshold T.

If the likelihood ratio ST in the tentative track information is greater than or equal to the upper limit threshold $T_U$, the confirmed track determination unit 27 adopts the alternative hypothesis H1 and thus determines that the tentative track associated with the relevant tentative track information is a track of a target so that the track is confirmed. Accordingly, the confirmed track determination unit 27 retrieves the tentative track information of the tentative track, which has been determined to be a track of a target, from the tentative track storage unit 20, and outputs the retrieved tentative track information as information of a confirmed track so that it is stored into the track storage unit 10 of the track maintenance unit 1. In addition, the confirmed track determination unit 27 deletes the tentative track information of the tentative track, which has been determined to be a track of a target, from the tentative track storage unit 20.

If the likelihood ratio ST in the tentative track information is less than or equal to the lower limit threshold $T_L$, the confirmed track determination unit 27 adopts the null hypothesis H0 and thus determines that the tentative track associated with the relevant tentative track information is a track by a false alarm. Accordingly, the confirmed track determination unit 27 deletes the relevant tentative track information from the tentative track storage unit 20.

As for tentative track information whose likelihood ratio ST is not "greater than or equal to the upper limit threshold $T_U$" nor "less than or equal to the lower limit threshold $T_L$,", the confirmed track determination unit 27 keeps the corresponding tentative track as itself and maintains the tentative track information in the tentative track storage unit 20, so that the tentative track still functions as a target for the relevant determination.

The monitor threshold computation unit 28 computes a monitor threshold $T_M$ using the above-described second error rate β and an error rate $\alpha_M$ for monitor tracks that is higher than the first error rate α, according to the following formula (6):

$$T_M = \ln\left(\frac{1-\beta}{\alpha_M}\right) \qquad (6)$$

The monitor threshold computation unit 28 outputs the computed monitor threshold $T_M$ to the monitor track determination unit 29.

The formula (6) is obtained by replacing the first error rate α with the error rate $\alpha_M$ in the above formula (5) that computes the upper limit threshold $T_U$. Therefore, substantially, the higher the error rate $\alpha_M$ (for computing the monitor threshold) in comparison with the first error rate α, the lower the monitor threshold $T_M$ in comparison with the upper limit threshold $T_U$.

The monitor track determination unit 29 retrieves the tentative track information of each tentative track from the tentative track storage unit 20, and compares the likelihood ratio ST included in the retrieved tentative track information with the monitor threshold $T_M$ computed by the monitor threshold computation unit 28. According to the above computation, the monitor track determination unit 29 determines each tentative track, that has a likelihood ratio greater than the monitor threshold $T_M$, a monitor track, and outputs information (that includes a state vector) about the monitor track to the operation and display unit 3.

The monitor threshold $T_M$, the lower limit threshold $T_L$, and the upper limit threshold $T_U$ each may be computed in advance and supplied to the monitor track determination unit 29 (for $T_M$) and the confirmed track determination unit 27 (for $T_L$ and $T_U$). In addition, The monitor threshold $T_M$, the lower limit threshold $T_L$, and the upper limit threshold Tu each may be any numerical value directly input (via the operation and display unit 3) by an operator using an input device such as a keyboard or the like. Instead, the monitor threshold $T_M$ may by indirectly controlled (via the operation and display unit 3) by an operator who appropriately adjusts the coefficient $\alpha_M$ using the above input device. Accordingly, the operator can appropriately modify the number of monitor tracks that appear on a display screen of the operation and display unit 3 by varying the monitor threshold $T_M$ using the input device.

When the operator can vary the monitor threshold $T_M$ using the input device, it is not obvious how high the probability that "each monitor track extracted by the varied monitor threshold $T_M$ is a track of a target" is. Therefore, the monitor threshold computation unit 28 may compute the coefficient $\alpha_M$ using the monitor threshold $T_M$ and the above formula (6), and output the computed value to the operation and display unit 3. In this case, the operation and display unit 3 displays the coefficient $\alpha_M$ supplied from the monitor threshold computation unit 28 on its display screen. Accordingly, the operator can know how high the probability that "each tentative track (i.e., monitor track) extracted by the monitor threshold $T_M$ set by the operator is a track of a target" is, thereby tentative tracks having desired probability can be displayed as monitor tracks on the display screen of the operation and display unit 3.

FIG. 5 is a flowchart showing a specific example of the operation flow that is applied to each tentative track and is executed by the information presenting apparatus in the present embodiment. The operation shown by the flowchart is executed, for example, every time the scan signal is input, that is, every time the opportunity for updating the tentative track occurs.

As shown in the flowchart, the correlation determination unit 21 of the track generation unit 2 receives each observed value from the track maintenance unit 1 (see step S1).

The correlation gate generation unit 24 updates the predicted values in the tentative track information stored in the tentative track storage unit 20, based on the observation time for the observed value. The correlation determination unit 21 computes a correlation between the receives observed value and each tentative track information item stored in the tentative track storage unit 20. Based on the correlation between the observed value and each tentative track information item, the correlation determination unit 21 determines a correspondence relationship between the observed value and the relevant tentative track (see step S2).

The likelihood ratio computation unit 26 sequentially retrieves the tentative track information items stored in the tentative track storage unit 20, and computes the likelihood ratio ST of the retrieved tentative track information. The likelihood ratio computation unit 26 then stores the computed likelihood ratio ST into the tentative track storage unit 20 (see step S3).

If the operator inputs control data for indirectly varying the monitor threshold $T_M$ via the operation and display unit 3, the monitor threshold computation unit 28 computes the monitor threshold $T_M$ using the above formula (6) based on the control data. The control data includes the error rate $\alpha_M$ and is generated based on control information input by the operator using the operation and display unit 3.

The confirmed track determination unit 27 subjects each tentative track information item stored in the tentative track storage unit 20 to the operation from step S5 to step S12 (see step S4). In the operation, the confirmed track determination unit 27 uses the upper limit threshold $T_U$ and the lower limit threshold $T_L$, which are stored in its storage unit, in the comparison with the likelihood ratio.

The confirmed track determination unit 27 retrieves the tentative track information from the tentative track storage unit 20 (see step S5) and determines whether or not the likelihood ratio ST included in the retrieved tentative track information is less than or equal to the lower limit threshold $T_L$ (see step S6).

If the likelihood ratio ST is less than or equal to the lower limit threshold $T_L$ (i.e., "YES" in step S6), the confirmed track determination unit 27 deletes the retrieved tentative track information from the tentative track storage unit 20 (see step S12) and returns the operation to step S5 so as to process the next tentative track.

If the likelihood ratio ST is greater than the lower limit threshold $T_L$ (i.e., "NO" in step S6), the confirmed track determination unit 27 determines whether or not the likelihood ratio ST included in the retrieved tentative track information is greater than or equal to the upper limit threshold $T_U$ (see step S7).

If the likelihood ratio ST is greater than or equal to the upper limit threshold $T_U$ (i.e., "YES" in step S7), the confirmed track determination unit 27 determines the tentative track corresponding to the retrieved tentative track information to be a track of a target (see step S8) and outputs the relevant tentative track information as new track information to the track maintenance unit 1 (see step S9). The confirmed track determination unit 27 then returns the operation to step S5 so as to process the next tentative track. The track maintenance unit 1 assigns a track number to the received tentative track information as information of the confirmed track so that the tentative track number is replaced with the assigned track number and the relevant track information is stored into the track storage unit 10.

If the likelihood ratio ST is less than the upper limit threshold $T_U$ (i.e., "NO" in step S7), the confirmed track determination unit 27 maintains the relevant tentative track as itself (i.e., tentative track).

The monitor track determination unit 29 then determines whether or not the likelihood ratio ST is greater than or equal to the monitor threshold $T_M$ (see step S10).

If the likelihood ratio ST is greater than or equal to the monitor threshold $T_M$ (i.e., "YES" in step S10), the monitor track determination unit 29 determines the relevant tentative track to be a monitor track and outputs it to the operation and display unit 3 (see step S11) and returns the operation to step S5 so as to process the next tentative track. Accordingly, based on the information about the state vector of the monitor track supplied from the monitor track determination unit 29, the operation and display unit 3 displays a mark that represents the monitor track on its display screen.

If the likelihood ratio ST is less than the monitor threshold $T_M$ (i.e., "NO" in step S10), the monitor track determination unit 29 returns the operation to step S5 so as to process the next tentative track.

The correlation determination unit 21 determines whether or not every observed value has corresponded to any tentative track (see step S13). If every observed value has corresponded to any tentative track (i.e., "YES" in step S13), the operation of this flow is completed.

In contrast, if there is an observed value that has not corresponded to any tentative track (i.e., "NO" in step S13), the tentative track generation unit 22 generates tentative track information for each observed value that has not corresponded to any tentative track, and stores the generated tentative track information into the tentative track storage unit 20 (see step S14). The operation of this flow is then completed.

According to the above-described operation, the track generation unit 2 performs the operation for the tentative track using each observed value that has been determined (by the track maintenance unit 1) to have no correlation with any track. Instead, the track maintenance unit 1 may output all observed values, which include each observed value that has been determined to correlate with any track, to the track generation unit 2.

In addition, regarding the above step S3, the confirmed track determination unit 27 may not store the upper limit threshold $T_U$ and the lower limit threshold $T_L$ in its storage unit, and the upper limit threshold $T_U$ and the lower limit threshold $T_L$ in its storage unit may be computed based on control data every time the operation in the flowchart is executed. The control data includes the first error rate α. The confirmed track determination unit 27 computes the lower limit threshold $T_L$ and the upper limit threshold $T_U$ using the respective formulas (4) and (5).

Figure 6A:
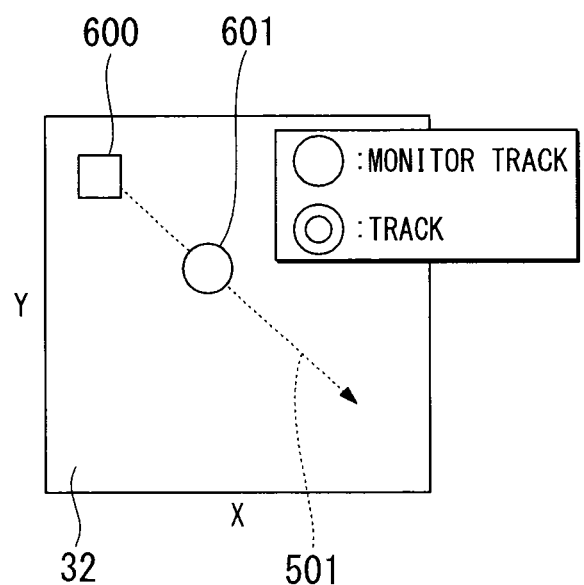
FIGS. 6A to 6C are diagrams that show examples of display for the monitor track and the (confirmed) track on a display screen of the operation and display unit in the first embodiment.
Figure 6B:
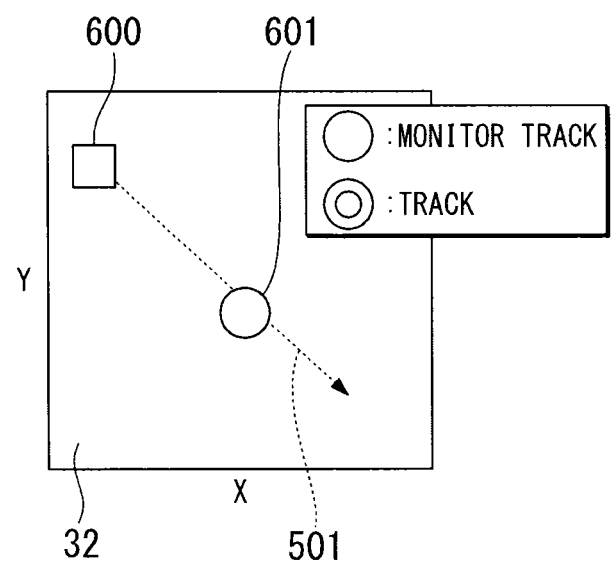
Figure 6C:
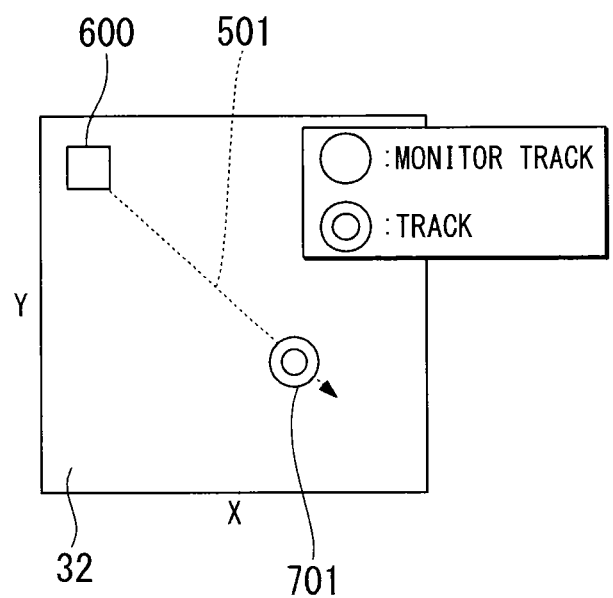

FIGS. 6A to 6C are diagrams that show examples of display for the monitor track and the (confirmed) track on a display screen 32 of the operation and display unit 3. Based on the information about the state vector of each monitor track supplied from the monitor track determination unit 29, the operation and display unit 3 displays the mark of the relevant monitor track on its display screen 32.

In FIGS. 6A to 6C, the x and y axes may respectively indicate the longitude and the latitude. For the purpose of convenience, reference numeral 600 indicates a position (indicated by a square in each figure) at which an observed value has been determined to be a new tentative track. Therefore, no mark that indicates the position 600 is actually displayed on the display screen 32 of the operation and display unit 3. Similarly, reference numeral 501 indicates an arrow (see a dotted arrow in each figure) that conveniently represents a direction in which the relevant target moves, and actually such an arrow is not displayed on the display screen 32 of the operation and display unit 3.

FIGS. 6A, 6B, and 6C respectively show the first, second, and third states.

In the first state (FIG. 6A), after a number of scans that have been executed after a new tentative track was determined at position 600, the likelihood ratio ST becomes greater than or equal to the monitor threshold $T_M$, so that the operation and display unit 3 displays a monitor track 601 (see a circle in FIG. 6A) on its display screen 32. Since the tentative track of the relevant target has moved in a direction indicated by the arrow 501, the display position of the monitor track 601 is shifted from the position 600 along the direction indicated by the arrow 501.

The second state (FIG. 6B) is observed after a number of scans that have been executed after the first state is obtained. In the second state, the likelihood ratio ST becomes greater than or equal to the monitor threshold $T_M$, so that the operation and display unit 3 displays a monitor track 601 on its display screen 32. Since the tentative track of the relevant target has moved in a direction indicated by the arrow 501, the display position of the monitor track 601 is further shifted from the displayed position in FIG. 6A along the direction indicated by the arrow 501.

The third state (FIG. 6C) is observed after a number of scans that have been executed after the second state is obtained. In an interval from the state of FIG. 6B to the state of FIG. 6C, the tentative track corresponding to the relevant monitor track has been determined to a track of a target. Therefore, in the third state, the operation and display unit 3 displays a track 701 (as the confirmed track of the target: see a double circle in FIG. 6C) on its display screen 32. Since the target has moved in a direction indicated by the arrow 501, the display position of the track 701 is further shifted from the displayed position of the monitor track 601 in FIG. 6B along the direction indicated by the arrow 501.

In order that the operator who observes the display screen can distinguish each track from each monitor track that is a tentative track having a certain degree of probability (that it is a track of a target), the operation and display unit 3 distinguishably displays each track and each monitor track on its display screen 32 by means of different shapes, colors, sizes, luminance values, or a combination thereof. For example, the degree of gradation for displaying the monitor track is varied according to the above probability of the monitor track so that the probability is visually and clearly indicated to the operator.

In accordance with the present embodiment, each tentative track having a likelihood ratio ST greater than or equal to the monitor threshold $T_M$ is displayed as a monitor track. Therefore, in comparison with the time lag from the determination as a tentative track to the determination as a confirmed track of a target, a monitor track having a certain degree of the probability that the relevant tentative track is a track of a target is displayed with a shorter time lag. Consequently, the amount of information provided to the operator can be increased in comparison with the conventional method, thereby the operator can easily perform an appropriate determination.

As described above, the present embodiment employs a method which does not display every observed value supplied from the sensors but chooses and displays only tentative tracks (as monitor tracks) that each have a certain degree of probability that the tentative track is a track of a target. Therefore, the present embodiment prevents the amount of information from excessively increasing, and thus prevents the operator's appreciation of the situation from being degraded.

As also described above, according to the present embodiment, the operator can perform appropriate control via the operation and display unit 3 through the direct adjustment of the monitor threshold $T_M$ or the indirect adjustment thereof via the adjustment of the coefficient $α_M$. Therefore, the operator can control the number of monitor tracks displayed on the display screen of the operation and display unit 3, that is, the amount of information to be observed, as the operator chooses. Therefore, it is possible to produce the display conformable to the operator's capability of processing the relevant information, so that the operator can easily catch the status of each target.

Additionally, in the present embodiment, the operator can directly or indirectly vary the monitor threshold $T_M$ so as to confirm how high the probabilities of the currently existing tentative tracks are in consideration of the probability for the monitor threshold $T_M$. That is, the operator can confirm the probability for each monitor track, which (the monitor track) was extracted by the monitor threshold $T_M$ and displayed on the display screen of the operation and display unit 3, by referring to the coefficient $α_M$ displayed on the display screen. Therefore, the operator can easily detect each monitor track having a high probability that the monitor track (i.e., tentative track) is determined to be a track of a target.

Second Embodiment

Figure 7:
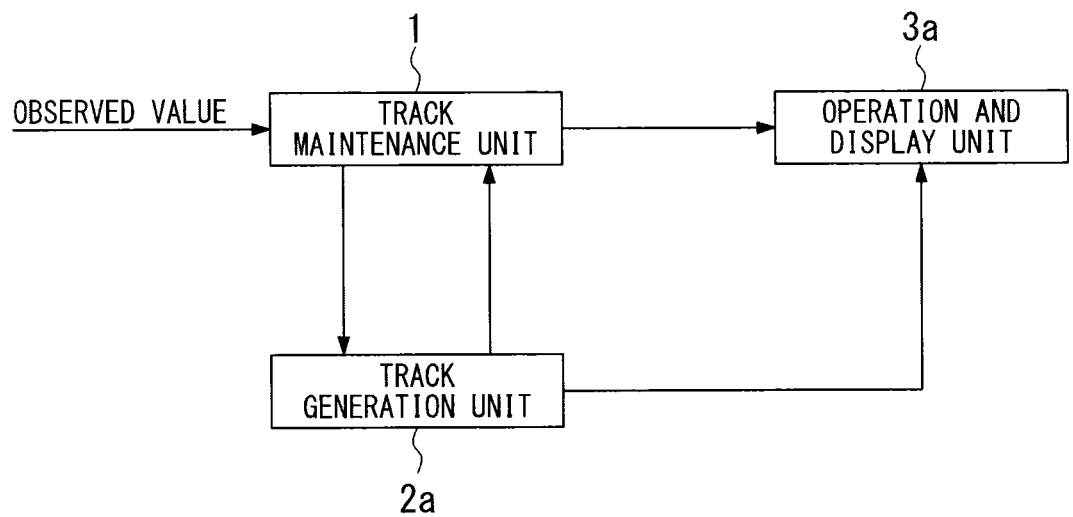
FIG. 7 is a block diagram that shows the structure of an information presenting apparatus of a second embodiment.

FIG. 7 is a block diagram showing the structure of the information presenting apparatus as a second embodiment, which includes a track maintenance unit 1, a track generation unit 2a, and an operation and display unit 3a. Similar to the information presenting apparatus in the first embodiment, based on observed values received from sensors (radar apparatus and the like), the information presenting apparatus of the present embodiment computes the track of a target and displays a result of the computation.

In comparison with the structure (see FIG. 1) of the information presenting apparatus in the first embodiment, the information presenting apparatus of the present embodiment has a structure in which the track generation unit 2 and the operation and display unit 3 are respectively replaced with a track generation unit 2a and an operation and display unit 3a. Since the track maintenance unit 1 is common between both embodiments, an explanation thereof is omitted here. Below, distinctive features of the second embodiment in comparison with the first embodiment will be explained.

Figure 8:
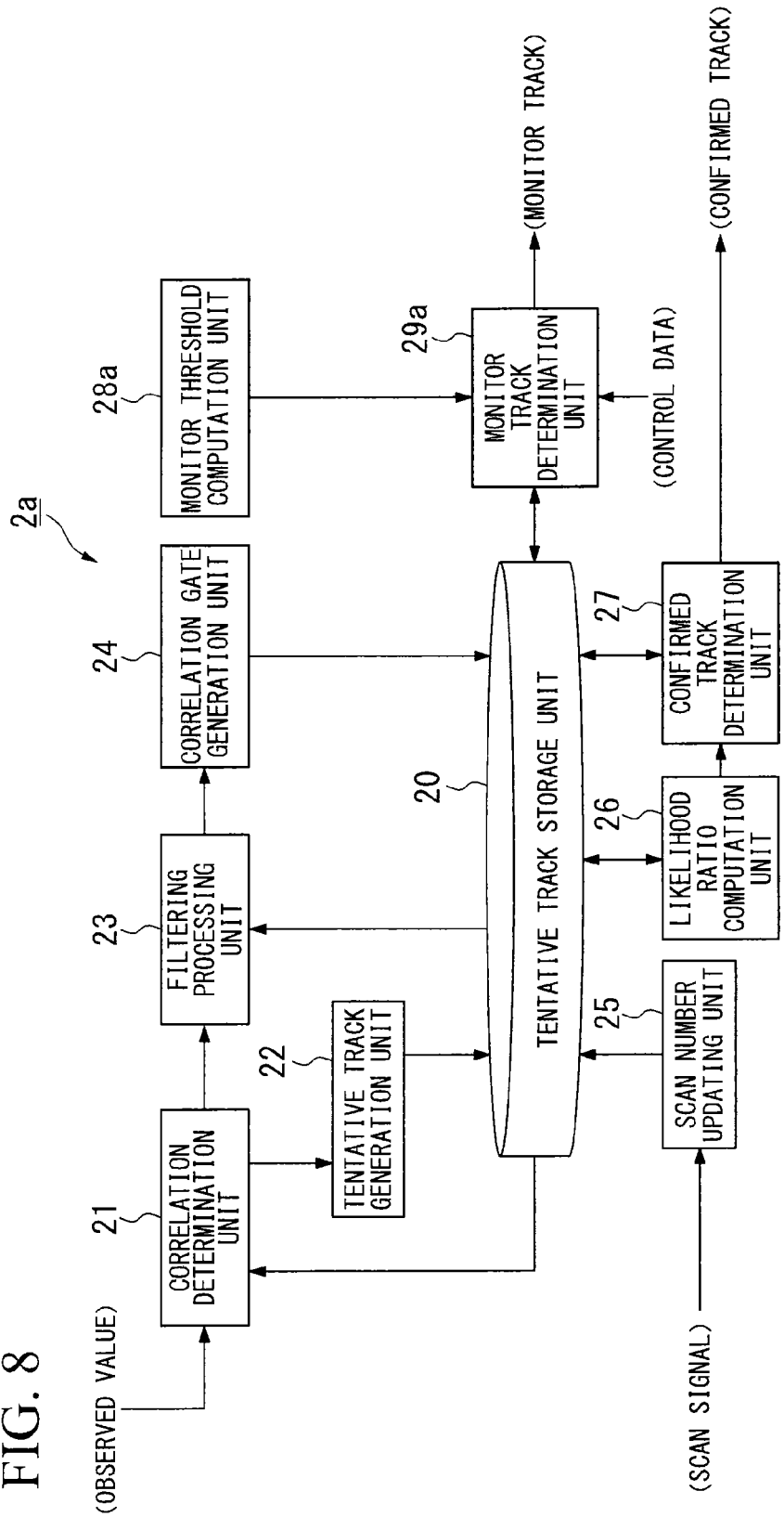
FIG. 8 is a block diagram that shows the structure of a track generation unit in the second embodiment.

FIG. 8 is a block diagram that shows the structure of the track generation unit 2a in the second embodiment. As shown in FIG. 8, the track generation unit 2a includes a tentative track storage unit 20, a correlation determination unit 21, a tentative track generation unit 22, a filtering processing unit 23, a correlation gate generation unit 24, a scan number updating unit 25, a likelihood ratio computation unit 26, a confirmed track determination unit 27, a monitor threshold computation unit 28a, and a monitor track determination unit 29a.

Instead of the monitor threshold $T_M$ in the first embodiment, the second embodiment employs a plurality of monitor thresholds represented by ith monitor threshold $T_{Mi}$ (i=1, 2, . . . , and I) that is computed by the monitor threshold computation unit 28a and will be explained below.

The monitor threshold computation unit 28a computes the ith monitor threshold $T_{Mi}$ using the second error rate β and an error rate $\alpha_{Mi}$ that is supplied by the operation and display unit 3a based on the following formula (7):

$$T_{Mi} = \ln\left(\frac{1-\beta_{Mi}}{\alpha_{Mi}}\right) \quad (7)$$

An error rate $\beta_{Mi}$ (in formula (7)) for the ith monitor threshold is computed by the following formula (8):

$$\beta_{Mi} = A_i \beta \quad (8)$$

$(1 - \beta_{Mi}) = 1 - A_i + A_i(1 - \beta)$ EQUIVALENT

EXPRESSION OF (8) WHERE $$A_i = \frac{1 - \alpha_{Mi}}{1 - \alpha}$$

In the above formula (8), the first error rate $\alpha_{Mi}$ for the ith monitor threshold $T_{Mi}$ is greater than the first error rate α (i.e., $\alpha < \alpha_{Mi}$). Therefore, the second error rate $\beta_{Mi}$ for the ith monitor threshold $T_{Mi}$ and the second error rate β have a relationship "$\beta_{Mi} < \beta$". According to formula (8), the ith monitor threshold $T_{Mi}$ and the upper limit threshold $T_U$ have a relationship "$T_{Mi} < T_U$". Therefore, similar to the first embodiment, each value of the ith monitor threshold $T_{Mi}$ has a lower reliability than that for the upper limit threshold $T_U$.

When I=2, if the first error rate $\alpha_{M1}$ for the first monitor threshold $T_{M1}$, the first error rate $\alpha_{M2}$ for the second monitor threshold $T_{M2}$, and the first error rate α have a relationship "$\alpha_{M1} \geq \alpha_{M2} < \alpha$", then the upper limit threshold $T_U$, the first monitor threshold $T_{M1}$, and the second monitor threshold $T_{M2}$ have a relationship "$T_U > T_{M2} \geq T_{M1}$".

The monitor threshold computation unit 28a computes the first monitor threshold $T_{M1}$ and the second monitor threshold $T_{M2}$ using the first error rate α, the second error rate 13, the first error rate $\alpha_{M1}$ for the first monitor threshold $T_{M1}$, and the first error rate $\alpha_{M2}$ for the second monitor threshold $T_{M2}$, based on the above formulas (7) and (8). In this process, each tentative track chosen by the second monitor threshold $T_{M2}$ has a higher probability (that the tentative track is a track of a target) than that of each tentative track chosen by the first monitor threshold $T_{M1}$.

The monitor track determination unit 29a compares each of the second monitor threshold $T_{M2}$ and the first monitor threshold $T_{M1}$ with the likelihood ratio ST computed by the likelihood ratio computation unit 26. If the likelihood ratio ST is greater than or equal to the second monitor threshold $T_{M2}$, the monitor track determination unit 29a outputs a control signal to display a second monitor track to the operation and display unit 3a. If the likelihood ratio ST is greater than or equal to the first monitor threshold $T_{M1}$, the monitor track determination unit 29a outputs a control signal to display a first monitor track to the operation and display unit 3a.

The operation and display unit 3a displays each of the first monitor track, the second monitor track, and the track on its display screen. In order that the operator can easily distinguish the first monitor track, the second monitor track, and the track from each other, the operation and display unit 3a distinguishably displays them by means of different shapes, colors, sizes, luminance values, or a combination thereof. According to an ever-changing display of each monitor track, the operator can visually confirm a variation in reliability (i.e., probability) that the tentative track is a track of a target. Additionally, for each tentative track displayed as a monitor track on the display screen, the operator can specify one which has a high probability of being determined to be a track of a target, and thus can easily choose such a tentative track to be an object to be observed.

Figure 9:
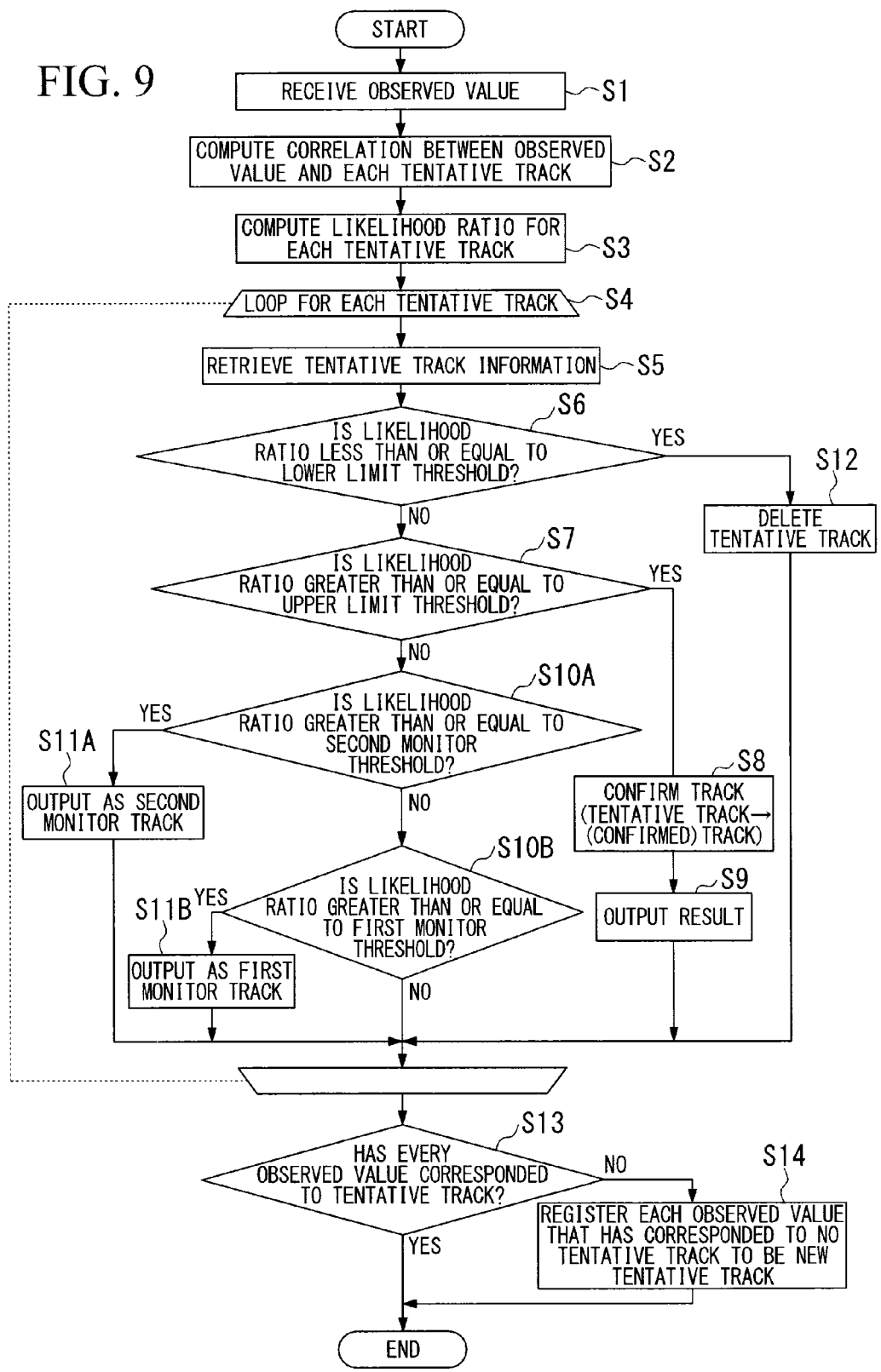
FIG. 9 is a flowchart that shows an operation applied to each tentative track in the second embodiment.

FIG. 9 is a flowchart showing a specific example of the operation flow that is applied to each tentative track and is executed by the information presenting apparatus in the present embodiment. The operation shown by the flowchart is executed, for example, every time the scan signal is input, that is, every time the opportunity for updating the tentative track occurs.

In the flowchart of FIG. 9, steps identical to those in the flowchart (i.e., the first embodiment) of FIG. 5 are given identical reference symbols. In comparison with the first embodiment, steps S10A and S10B are provided in place of step S10, and steps S11A and S11B are provided in place of step S11.

In the flowchart of FIG. 9, the likelihood ratio computation unit 26 sequentially retrieves the tentative track information items stored in the tentative track storage unit 20, and computes the likelihood ratio ST of the retrieved tentative track information. The likelihood ratio computation unit 26 then stores the computed likelihood ratio ST into the tentative track storage unit 20 (see step S3).

Based on the control data that includes the error rate $\alpha_{Mi}$, the monitor threshold computation unit 28a computes the ith monitor threshold $T_{Mi}$ using the above formulas (7) and (8). Below, the present embodiment will be explained for a case that I=2 which requires the first monitor threshold $T_{M1}$ and the second monitor threshold $T_{M2}$.

The above-described steps S10A, S10B, S11A, and S11B will be explained below.

The monitor track determination unit 29a compares the second monitor threshold $T_{M2}$ with the likelihood ratio ST computed by the likelihood ratio computation unit 26 (see step S10A).

If the likelihood ratio ST is greater than or equal to the second monitor threshold $T_{M2}$ (i.e., "YES" in step S10A), the monitor track determination unit 29a determines the relevant tentative track to be a second monitor track and outputs it to the operation and display unit 3a (see step S11A) and returns the operation to step S5 so as to process the next tentative track. If the likelihood ratio ST is less than the second monitor threshold $T_{M2}$ (i.e., "NO" in step S10A), the monitor track determination unit 29a executes step S10B.

The monitor track determination unit 29a then compares the first monitor threshold $T_{M1}$ with the likelihood ratio ST computed by the likelihood ratio computation unit 26 (see step S10B).

If the likelihood ratio ST is greater than or equal to the first monitor threshold $T_{M1}$ (i.e., "YES" in step S10B), the monitor track determination unit 29a determines the relevant tentative track to be a first monitor track and outputs it to the operation and display unit 3a (see step S11B) and returns the operation to step S5 so as to process the next tentative track. If the likelihood ratio ST is less than the first monitor threshold $T_{M1}$ (i.e., "NO" in step S10B), the monitor track determination unit 29a returns the operation to step S5 so as to process the next tentative track.

Figure 10A:
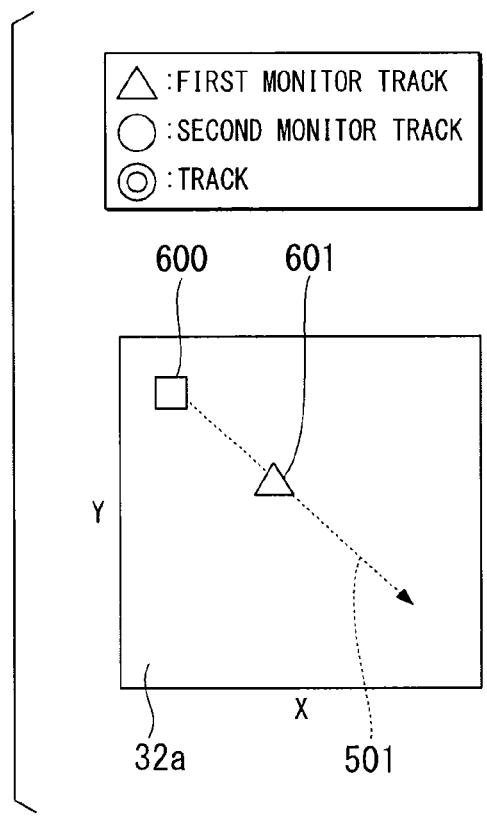
FIGS. 10A to 10C are diagrams that show examples of display for the monitor track and the (confirmed) track on a display screen of the operation and display unit in the second embodiment.
Figure 10B:
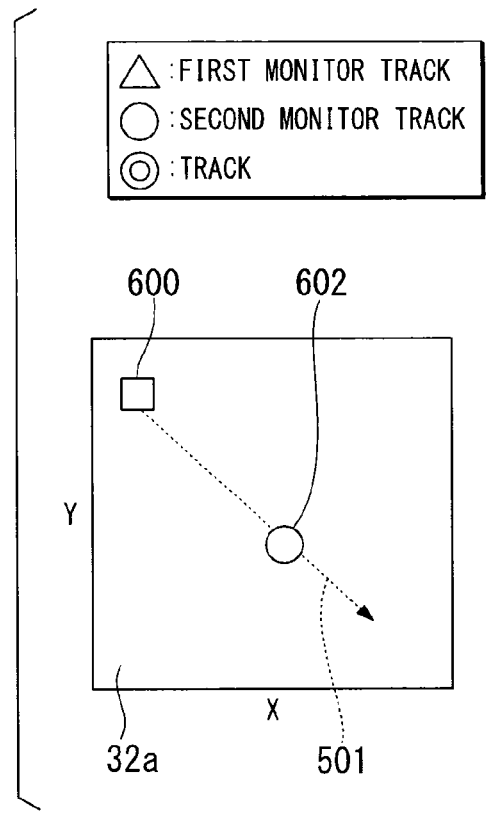
Figure 10C:
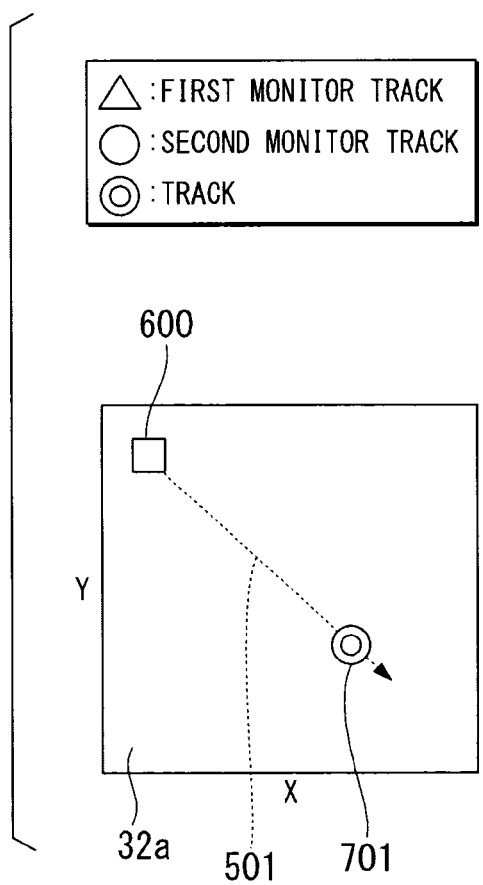
Figure 11:
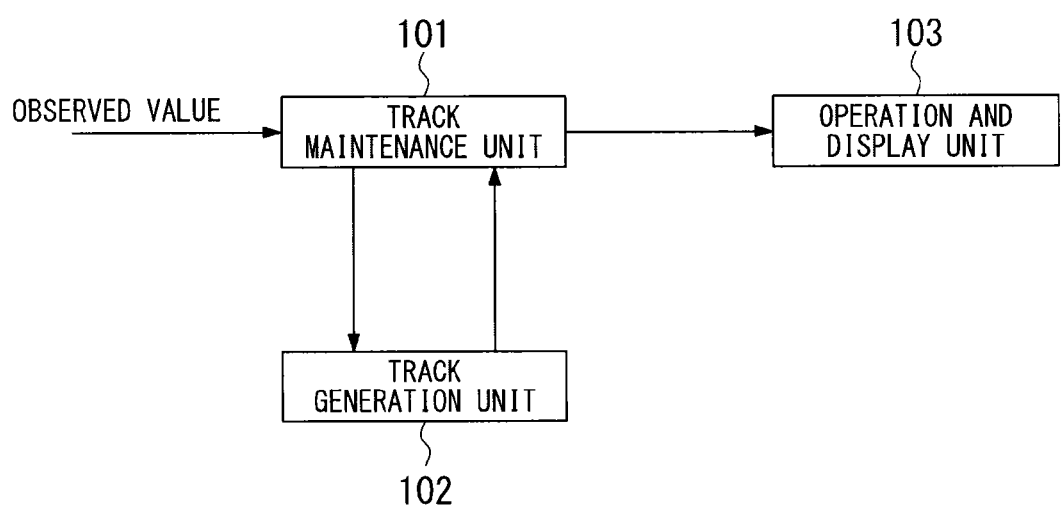
FIG. 11 is a block diagram that shows an example of known information presenting apparatuses.
Figure 12:
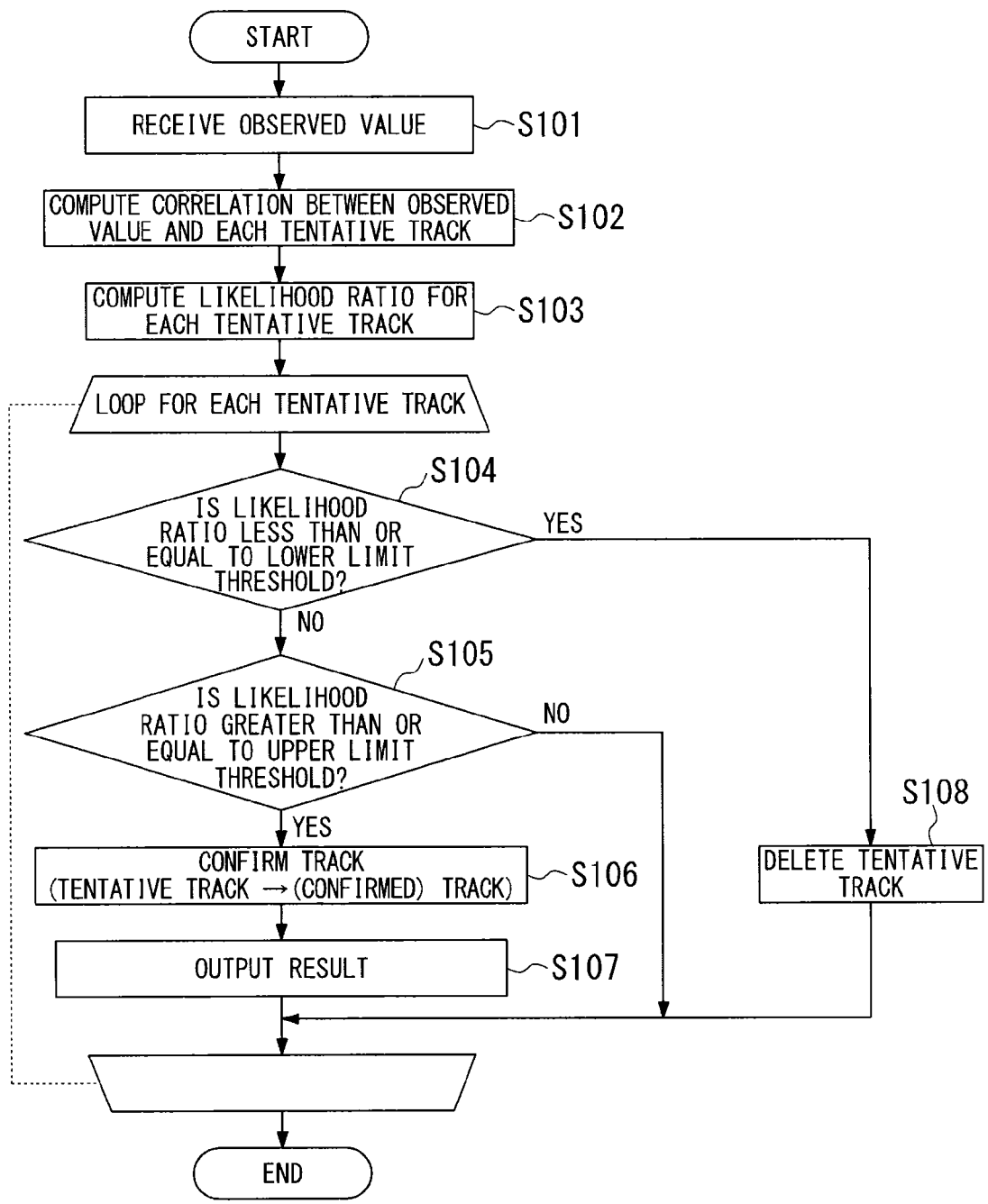
FIG. 12 is a flowchart that shows an operation applied to each tentative track in a known information presenting apparatus.
Figure 13:
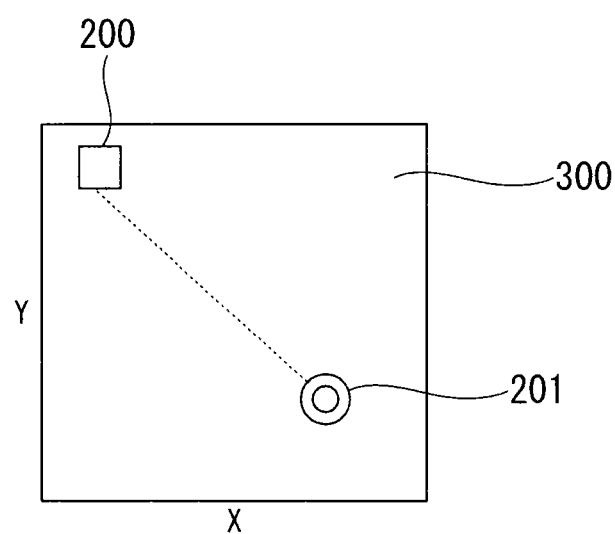
FIG. 13 is a diagram that shows an example of the track displayed on a display screen of a known information presenting apparatus.
Figure 14:
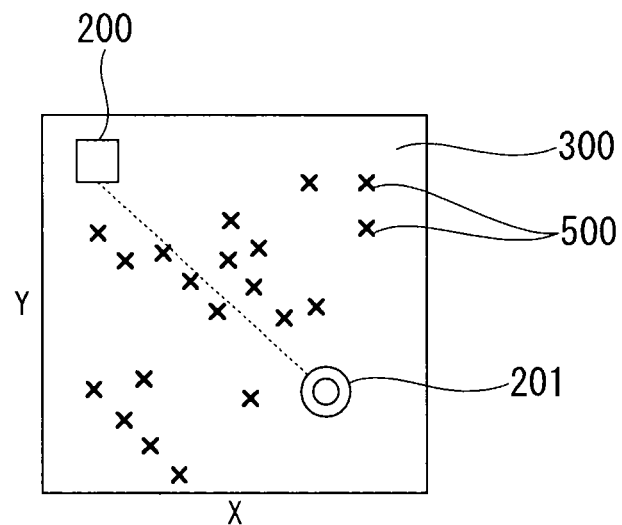
FIG. 14 is a diagram that shows another example of the track displayed on a display screen of a known information presenting apparatus.

FIGS. 10A to 10C are diagrams that show examples of display for each monitor track and the (confirmed) track on a display screen 32a of the operation and display unit 3a. In FIGS. 10A to 10C, the x and y axes may respectively indicate the longitude and the latitude. FIGS. 10A, 10B, and 10C respectively show specific examples of the first, second, and third states.

In the first state (FIG. 10A), a position 600 at which an observed value has been determined to be a new tentative track is shown on the display screen 32a. The operation and display unit 3a also displays a first monitor track 601 on its display screen 32a. Similar to FIGS. 6A to 6C, the position 600 (indicated by a square in FIGS. 10A to 10C) conveniently indicates a position at which an observed value has been determined to be a new tentative track. Therefore, no mark that indicates the position 600 is actually displayed on the display screen 32a of the operation and display unit 3a. Similarly, reference numeral 501 indicates an arrow (see a dotted arrow in each figure) that conveniently represents a direction in which the relevant target moves, and actually such an arrow is not displayed on the display screen 32a of the operation and display unit 3a.

After a number of scans that have been executed after a new tentative track was determined at position 600, the likelihood ratio ST becomes greater than or equal to the first monitor threshold $T_{M1}$, so that the operation and display unit 3a displays a first monitor track 601 (see a triangle in FIG. 10A) on its display screen 32a in response to the relevant instruction from the monitor track determination unit 29a. Since the relevant target has moved in a direction indicated by the arrow 501, the display position of the first monitor track 601 has been shifted from the position 600 during the interval between the relevant scans.

The second state (FIG. 10B) is observed after a number of scans that have been executed after the first state is obtained. In the second state, the likelihood ratio ST becomes greater than or equal to the second monitor threshold $T_{M2}$, so that the operation and display unit 3a displays a second monitor track 602 (see a circle in FIG. 10B) on its display screen 32a. Since the relevant target has moved in a direction indicated by the arrow 501, the display position of the second monitor track 602 has been shifted from the displayed position of the first monitor track 601 in FIG. 10A during the interval between the relevant scans.

The third state (FIG. 10C) is observed after a number of scans that have been executed after the second state is obtained. In consideration that the tentative track of the second monitor track 602 has been determined to be a track of the target, the operation and display unit 3a displays a track 701 (as the confirmed track of the target: see a double circle in FIG. 10C) on its display screen 32a.

As described above, in the present embodiment, each tentative track having a likelihood ratio greater than or equal to the first monitor threshold $T_{M1}$ is determined to be a first monitor track, and each tentative track having a likelihood ratio greater than or equal to the second monitor threshold $T_{M2}$ is determined to be a second monitor track. Therefore, even for a tentative track, it can be displayed as a monitor track based on probabilities for the first monitor threshold $T_{M1}$ and the second monitor threshold $T_{M2}$. Since monitor tracks having a different degrees of reliabilities are displayed, the operator can recognize an ever-changing reliability of each tentative track and thus confirm the relevant state until a tentative track is determined to be a track of a target in more detail in comparison with the first embodiment. In addition, the operator can confirm the probability for each monitor track, which (the monitor track) was extracted by each monitor threshold $T_{Mi}$ and displayed on the display screen of the operation and display unit 3a, by referring to the coefficient $\alpha_{Mi}$ displayed on the display screen. Therefore, the operator can easily detect each monitor track having a high probability that the monitor track (i.e., tentative track) is determined to be a track of a target.

Additionally, similar to the first embodiment, in comparison with the time lag from the determination as a tentative track to the determination as a confirmed track of a target, a tentative track having a certain degree of the probability that the relevant tentative track is a track of a target is displayed as monitor tracks whose probabilities increase step by step, with a shorter time lag. Consequently, the amount of information provided to the operator can be increased in comparison with the conventional method, thereby the operator can easily perform an appropriate determination.

In addition, the probability $P_F$ of detecting a false alarm used in the above-described embodiments may be set to a value obtained by multiplying the number of false alarms per unit space (or unit area) by the size (space or area) of the correlation gate. In such a case, in consideration that the probability $P_F$ of detecting a false alarm varies according to the gate size, the above formula (1) for computing the likelihood ratio ST may be replaced with the following formula (9) so as to compute the likelihood ratio ST:

$$ST(k) = \begin{cases} ST(k-1) + a_1 + a_2; & \text{TENTATIVE TRACK HAS BEEN UPDATED} \\ ST(k-1) + a_2; & \text{NO UPDATE OF TENTATIVE TRACK} \end{cases} \quad (9)$$

Additionally, the embodiments use natural logarithm (ln) in the computation of the upper limit threshold $T_U$, the lower limit threshold $T_L$, the monitor threshold $T_M$, and the monitor threshold $T_{Mi}$. However, instead of the natural logarithm, common logarithm ($\log_{10}$) may be used. Furthermore, the formulas may be modified while required relationships therebetween are secured, or antilogarithm may be used instead of logarithm.

When computing the monitor threshold $T_M$ in the first embodiment, instead of formula (6), formulas (7) and (8) may be used by replacing $\alpha_M$ with $\alpha_{M}$.

On the other hand, when computing the monitor threshold $T_m$, in the second embodiment, instead of formulas (7) and (8), formula (6) may be used by replacing $\alpha_M$ with $\alpha_{Mi}$.

A program for implementing the functions of the track maintenance unit 1 and the track generation unit 2 or 2a in FIG. 1 or 7 in the above embodiments may be stored in a computer readable storage medium, and the program stored in the storage medium may be loaded and executed on a computer system so that the system functions as the track maintenance unit 1 and the track generation unit 2 or 2a. Here, the computer system may have hardware resources which include an OS, peripheral devices, and the like. The computer system may employs a WWW system that provides a homepage service (or viewable) environment.

The above computer readable storage medium is a storage device, for example, a portable medium such as a flexible disk, a magneto optical disk, a ROM, or a CD-ROM, or a memory device such as a hard disk built in a computer system.

The computer readable storage medium also includes a device for temporarily storing the program, such as a volatile storage medium (e.g. DRAM (Dynamic Random Access Memory)) in a computer system which functions as a server or client and receives the program via a network (e.g., the Internet) or a communication line (e.g., a telephone line).

The above program, stored in a memory device of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such as a telephone line.

In addition, the program may execute a part of the above-explained functions.

The program may also be a "differential" program so that the above-described functions can be executed by a combination program of the differential program and an existing program which has already been stored in the relevant computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information presenting apparatus comprises:
    a receiver configured to receive each observed value from n sensors, n being an integer of 1 or greater;
    a processor configured to
        maintain a confirmed track of each target by updating the confirmed track based on an observed value which has a correlation with the confirmed track;
        output information of the confirmed track; and
        compute a likelihood ratio for a tentative track associated with an observed value;
    a comparator configured to compare the likelihood ratio with an upper limit threshold defined for determining whether or not the tentative track is determined to be a confirmed track of a target, wherein
        when the likelihood ratio is greater than or equal to the upper limit threshold, the comparator is configured to determine the tentative track corresponding to the relevant observed value to be a confirmed track of a target, and output information of the tentative track as information of the confirmed track; and
        when the likelihood ratio, that is determined to be less than the upper limit threshold, is greater than or equal to a monitor threshold which is lower than the upper limit threshold, the comparator is configured to determine the tentative track corresponding to the relevant observed value to be a monitor track, and output information of the tentative track as information of the monitor track; and
    a display configured present the information of the confirmed track and the information of the monitor track.

2. The information presenting apparatus in accordance with claim 1, wherein the display is configured to present the information of the confirmed track and the information of the monitor track in different presentation manners.

3. The information presenting apparatus in accordance with claim 1, further comprising:
    operation circuitry configured to change the monitor threshold in response to a user operation.

4. The information presenting apparatus in accordance with claim 1, wherein:
    a plurality of the monitor thresholds are set; and
    the comparator is configured to, every time the likelihood ratio becomes greater than or equal to each of the monitor thresholds, determine the relevant tentative track to be a monitor track associated with the relevant monitor threshold, and output information of the monitor track.

5. The information presenting apparatus in accordance with claim 1, wherein:
    the upper limit threshold is computed based on a ratio between a base probability that a track of a target is determined to be a track of a target and a base error rate of an error such that a track by a false alarm is determined to be a track of a target; and
    the processor is further configured to compute the monitor threshold based on a ratio between the base probability that a track of a target is determined to be a track of a target and an error rate for monitor tracks of an error such that a track by a false alarm is determined to be a track of a target, where the error rate for monitor tracks is higher than the base error rate.

6. The information presenting apparatus in accordance with claim 1, wherein:
    the upper limit threshold is computed based on a ratio between a base probability that a track of a target is determined to be a track of a target and a base error rate of an error such that a track by a false alarm is determined to be a track of a target;
    the processor is further configured to compute the monitor threshold based on a ratio between a monitor probability that a track of a target is determined to be a track of a target and an error rate for monitor tracks of an error such that a track by a false alarm is determined to be a track of a target, where the monitor probability has a value different from the base probability and the error rate for monitor tracks is higher than the base error rate; and
    the monitor probability is computed based on the base probability, the base error rate, and the error rate for monitor tracks.

7. An information presenting method comprises:
    a track maintenance step that receives each observed value from n sensors, n being an integer of 1 or greater, maintains a confirmed track of each target by updating the confirmed track based on an observed value which has a correlation with the confirmed track, and outputs information of the confirmed track;

a likelihood ratio computation step that computes a likelihood ratio for a tentative track associated with an observed value supplied in the track maintenance step;

a confirmed track determination step that compares the likelihood ratio with an upper limit threshold defined for determining whether or not the tentative track is determined to be a confirmed track of a target, wherein when the likelihood ratio is greater than or equal to the upper limit threshold, the confirmed track determination step determines the tentative track corresponding to the relevant observed value to be a confirmed track of a target, and outputs information of the tentative track as information of the confirmed track;

a monitor track determination step wherein when the likelihood ratio, that is determined to be less than the upper limit threshold, is greater than or equal to a monitor threshold which is lower than the upper limit threshold, the monitor track determination step determines the tentative track corresponding to the relevant observed value to be a monitor track, and outputs information of the tentative track as information of the monitor track; and an information presenting step that presents the information of the confirmed track, which is output in the track maintenance step, and the information of the monitor track, which is output in the monitor track determination step.

8. The information presenting method in accordance with claim 7, wherein the information presenting step presents the information of the confirmed track and the information of the monitor track in different presentation manners.

9. The information presenting method in accordance with claim 7, further comprising:

an operation step in which the monitor threshold is voluntarily changed.

10. The information presenting method in accordance with claim 7, wherein:

a plurality of the monitor thresholds are set; and every time the likelihood ratio becomes greater than or equal to each of the monitor thresholds, the monitor track determination step determines the relevant tentative track to be a monitor track associated with the relevant monitor threshold, and outputs information of the monitor track.

11. The information presenting method in accordance with claim 7, wherein:

the upper limit threshold is computed based on a ratio between a base probability that a track of a target is determined to be a track of a target and a base error rate of an error such that a track by a false alarm is determined to be a track of a target; and the method further comprises a monitor threshold computation step that computes the monitor threshold based on a ratio between the base probability that a track of a target is determined to be a track of a target and an error rate for monitor tracks of an error such that a track by a false alarm is determined to be a track of a target, where the error rate for monitor tracks is higher than the base error rate.

12. The information presenting method in accordance with claim 7, wherein:

the upper limit threshold is computed based on a ratio between a base probability that a track of a target is determined to be a track of a target and a base error rate of an error such that a track by a false alarm is determined to be a track of a target;

the method further comprises a monitor threshold computation step that computes the monitor threshold based on a ratio between a monitor probability that a track of a target is determined to be a track of a target and an error rate for monitor tracks of an error such that a track by a false alarm is determined to be a track of a target, where the monitor probability has a value different from the base probability and the error rate for monitor tracks is higher than the base error rate; and the monitor probability is computed based on the base probability, the base error rate, and the error rate for monitor tracks.

13. A non-transitory computer-readable storage medium which stores a program that makes a computer execute:

a track maintenance step that receives each observed value from n sensors, n being an integer of 1 or greater, maintains a confirmed track of each target by updating the confirmed track based on an observed value which has a correlation with the confirmed track, and outputs information of the confirmed track;

a likelihood ratio computation step that computes a likelihood ratio for a tentative track associated with an observed value supplied in the track maintenance step;

a confirmed track determination step that compares the likelihood ratio with an upper limit threshold defined for determining whether or not the tentative track is determined to be a confirmed track of a target, wherein when the likelihood ratio is greater than or equal to the upper limit threshold, the confirmed track determination step determines the tentative track corresponding to the relevant observed value to be a confirmed track of a target, and outputs information of the tentative track as information of the confirmed track;

a monitor track determination step wherein when the likelihood ratio, that is determined to be less than the upper limit threshold, is greater than or equal to a monitor threshold which is lower than the upper limit threshold, the monitor track determination step determines the tentative track corresponding to the relevant observed value to be a monitor track, and outputs information of the tentative track as information of the monitor track; and an information presenting step that presents the information of the confirmed track, which is output in the track maintenance step, and the information of the monitor track, which is output in the monitor track determination step.

14. The non-transitory computer-readable storage medium in accordance with claim 13, wherein the information presenting step presents the information of the confirmed track and the information of the monitor track in different presentation manners.

15. The non-transitory computer-readable storage medium in accordance with claim 13, wherein the program makes the computer further execute:

an operation step in which the monitor threshold is voluntarily changed.

16. The non-transitory computer-readable storage medium in accordance with claim 13, wherein:

a plurality of the monitor thresholds are set; and every time the likelihood ratio becomes greater than or equal to each of the monitor thresholds, the monitor track determination step determines the relevant tentative track to be a monitor track associated with the relevant monitor threshold, and outputs information of the monitor track.

17. The non-transitory computer-readable storage medium in accordance with claim 13, wherein:
the upper limit threshold is computed based on a ratio between a base probability that a track of a target is determined to be a track of a target and a base error rate of an error such that a track by a false alarm is determined to be a track of a target; and
the program makes the computer further execute a monitor threshold computation step that computes the monitor threshold based on a ratio between the base probability that a track of a target is determined to be a track of a target and an error rate for monitor tracks of an error such that a track by a false alarm is determined to be a track of a target, where the error rate for monitor tracks is higher than the base error rate.

18. The non-transitory computer-readable storage medium in accordance with claim 13, wherein:
the upper limit threshold is computed based on a ratio between a base probability that a track of a target is determined to be a track of a target and a base error rate of an error such that a track by a false alarm is determined to be a track of a target;
the program makes the computer further execute a monitor threshold computation step that computes the monitor threshold based on a ratio between a monitor probability that a track of a target is determined to be a track of a target and an error rate for monitor tracks of an error such that a track by a false alarm is determined to be a track of a target, where the monitor probability has a value different from the base probability and the error rate for monitor tracks is higher than the base error rate; and
the monitor probability is computed based on the base probability, the base error rate, and the error rate for monitor tracks.

* * * * *